United States Patent [19]

Gass

[11] Patent Number: 5,251,212

[45] Date of Patent: Oct. 5, 1993

[54] BUS TRANSMISSION METHOD AND SYSTEM

[75] Inventor: Raymond Gass, Erstein, France

[73] Assignee: Alcatel N.V., Amsterdam, Netherlands

[21] Appl. No.: 727,254

[22] Filed: Jul. 9, 1991

[30] Foreign Application Priority Data

Jul. 10, 1990 [FR] France ............................. 90 08750

[51] Int. Cl.$^5$ ............................................. H04J 3/02
[52] U.S. Cl. ................................. 370/85.2; 370/85.6; 370/94.1; 340/825.5
[58] Field of Search ................. 370/60, 85.1, 85.2, 370/85.6, 94.1, 85.3; 340/825.5, 825.51, 825.52

[56] References Cited

U.S. PATENT DOCUMENTS

| | | | |
|---|---|---|---|
| 4,593,282 | 6/1986 | Acampora et al. | 340/825.5 |
| 4,656,627 | 4/1987 | Hasley et al. | 370/85.2 |
| 4,670,872 | 6/1987 | Cordill | 370/85.6 |
| 4,736,368 | 4/1988 | Szczepanek | 370/85.6 |
| 4,740,956 | 4/1988 | Hailpern et al. | 370/85.2 |
| 4,768,189 | 8/1988 | Gopinath et al. | 370/85.2 |
| 4,797,879 | 1/1989 | Habbab et al. | 370/3 |
| 4,814,979 | 3/1989 | Neches | 370/85.6 |
| 4,899,143 | 2/1990 | Gopinath et al. | 340/825.5 |
| 5,063,561 | 11/1991 | Kimmo | 370/85.6 |

FOREIGN PATENT DOCUMENTS 0122765 10/1984 European Pat. Off. .
0294133 12/1988 European Pat. Off. .

Primary Examiner—Douglas W. Olms
Assistant Examiner—Alpus H. Hsu
Attorney, Agent, or Firm—Robbins, Berliner & Carson

[57] ABSTRACT

The transmission method and system use a bus (8) which interconnects a plurality of devices (4, 5A through 5E) requiring to communicate with each other using cells obtained by grouping together octets representative of isochronous or asynchronous transmission channels and which comprise "p" physical time-division multiplex links $8_1$ through $8_p$) to which each device is connected. The cells are transmitted in serial form, one cell per link, after a contention phase between devices simultaneously requiring to transmit during which these devices simultaneously use the same one of the "p" links to send on it conjointly and bit by bit a contention resolution message on the basis of their respective individual priority. Each contention phase is related to a different link and the contention phases are staggered in time so as to limit the unresolved contentions at any given time to a single one of the "p" physical links.

7 Claims, 3 Drawing Sheets

BUS TRANSMISSION METHOD AND SYSTEM

TECHNICAL FIELD

The invention concerns transmission method and system using a bus to interconnect a plurality of equipments needing to communicate with each other using cells obtained by grouping together octets representative of isochronous or asynchronous transmission channels, which bus comprises a plurality of time-division multiplex links to which each equipment is connected.

BACKGROUND ART

In a conventional way of interconnecting equipment, each equipment incorporates a transmitter-receiver unit and the transmitter-receiver units of all equipments are connected to a common bus, which may be duplicated.

Transmission by the various units on the bus is governed by a priority process, transmissions being sequenced according to the respective requirements of the equipments and within the overall framework of a given time-division transmission organization.

These organizations are defined, for example, in CCITT Recommendation G.704 which specifies various synchronous frame structures for transferring digital signals in the form of octets over a link operated on a timesharing basis. The bits constituting the signals transmitted in succession by the various transmitter units are transmitted serially by the links.

In a conventional way the structures referred to above are used to transmit octets embodying signals produced by conventional primary PCM multiplexers conforming to CCITT Recommendation G.732 for the transmission of speech signals on isochronous channels at the rate of one octet per channel and per frame following sampling and encoding of the speech signals in the form of octets.

An isochronous channel, for example, enables transmission of encoded speech signals relating to one of the two transmission directions of a communication between two telephones.

These structures also enable transmission of octets embodying information in digital form grouped into packets comprising a fixed number of octets which are transmitted in preferably successive frame time slots. An asynchronous channel is then formed by the succession of time slots used by a unit to send one or more consecutive cells of a packet.

It is known to transmit isochronous channel octets and cell octets in the same frames on the same link using time slots left free by the isochronous channels during consecutive frames to transmit the cells serially, octet by octet.

Single or duplicated link transmission systems of this type are very suitable if the digital bit rate is relatively low and the transmission is implemented electrically, the number and the respective bit rates of units connected being matched to the possibilities offered by the equipment chosen for the system and by the organization adopted.

To obtain the digital bit rates required by some systems it is known to interconnect the equipments by a transmission system whose bus is made up of "p" identical links in parallel. Each equipment is temporarily assigned all of the "p" links to send "p" data groups.

The links are preferably assigned to the equipments of a common system to meet their transmission requirements temporarily and on demand if said requirements vary during use; variations occur, for example, if the equipments are parts of a switching center in an integrated services digital network.

A known temporary assignment method consists in delegating the responsibility for assigning the bus to a master unit which may be incorporated into one of the equipments, which receives assignment requests and which is responsible for arbitrating any access conflicts. This is not entirely satisfactory from the security point of view in that to alleviate any failure of the master unit likely to block the transmission system it is standard practise to duplicate or even preferably to triplicate the master unit and the means enabling it to communicate with the other equipments. The solution then becomes complex, costly and increasingly unreliable.

Another solution is to have the equipments themselves solve problems of temporary assignment of the bus to the equipments requiring to transmit.

A contention structure common to all the interconnected equipments, for example, enables the exchange of specific contention information intended to allow the successive assignment of the bus to each of the equipments waiting to transmit, on the basis of requirements and constraints specific to those equipments, to the bus and, more generally, to the system as a whole.

A known contention structure provides for the addition of a supplementary contention link to which all the equipments of a transmission system are connected. Signalling is transmitted on this contention link by the equipment transmitting at a given time temporarily to prohibit transmission via the system by any other equipment, arrangements being made at the level of the organization of the equipment and, more generally, the level of the transmission system so that each equipment can normally transmit within time-delays compatible with its needs.

Failures affecting the contention link can block the transmission system and the solutions of the type mentioned above in relation to the first known solution succinctly outlined above lead to the same disadvantages which can be highly troublesome with a large number of transmission systems designed to operature virtually continuously and in particular when the system operates in real time, as in the case of the switching center mentioned above.

DISCLOSURE OF INVENTION

The invention therefore proposes a transmission method and system using a bus, an electrical bus in this instance but possibly a bus of another kind, in particular an optical bus, which interconnects a plurality of equipment needing to communicate with each other by means of cells obtained by grouping together octets from isochronous or asynchronous transmission channels and which comprises a plurality of time-division multiplex links to which each equipment is connected, said method and said system being adapted to offer a high degree of security and to adapt dynamically to the requirements of the units and more generally of the system as a whole, according to constraints applying and in particular constraints that may apply during operation in a degraded mode.

One feature of the method in accordance with the invention is that cells are transmitted from the equipments over the links in serial form with one cell per link following a contention phase between equipments simultaneously requiring to transmit during which said equipments simultaneously use a common one of the "p" links to transmit thereon conjointly and bit by bit a contention resolution message based on their respective individual priority translated into predetermined binary form, the lowest priority equipments disconnecting on the first bit of the contention resolution message received which does not match that which they send, the equipment authorized to send a cell on the link until this point affected by the contention being that for which the contention resolution message sent corresponds to that which it sent itself.

BRIEF DESCRIPTION OF DRAWINGS

The invention, its features and its advantages are explained in the following description with reference to the FIGURES listed below.

BEST MODE FOR CARRYING OUT THE INVENTION

Figure 1:
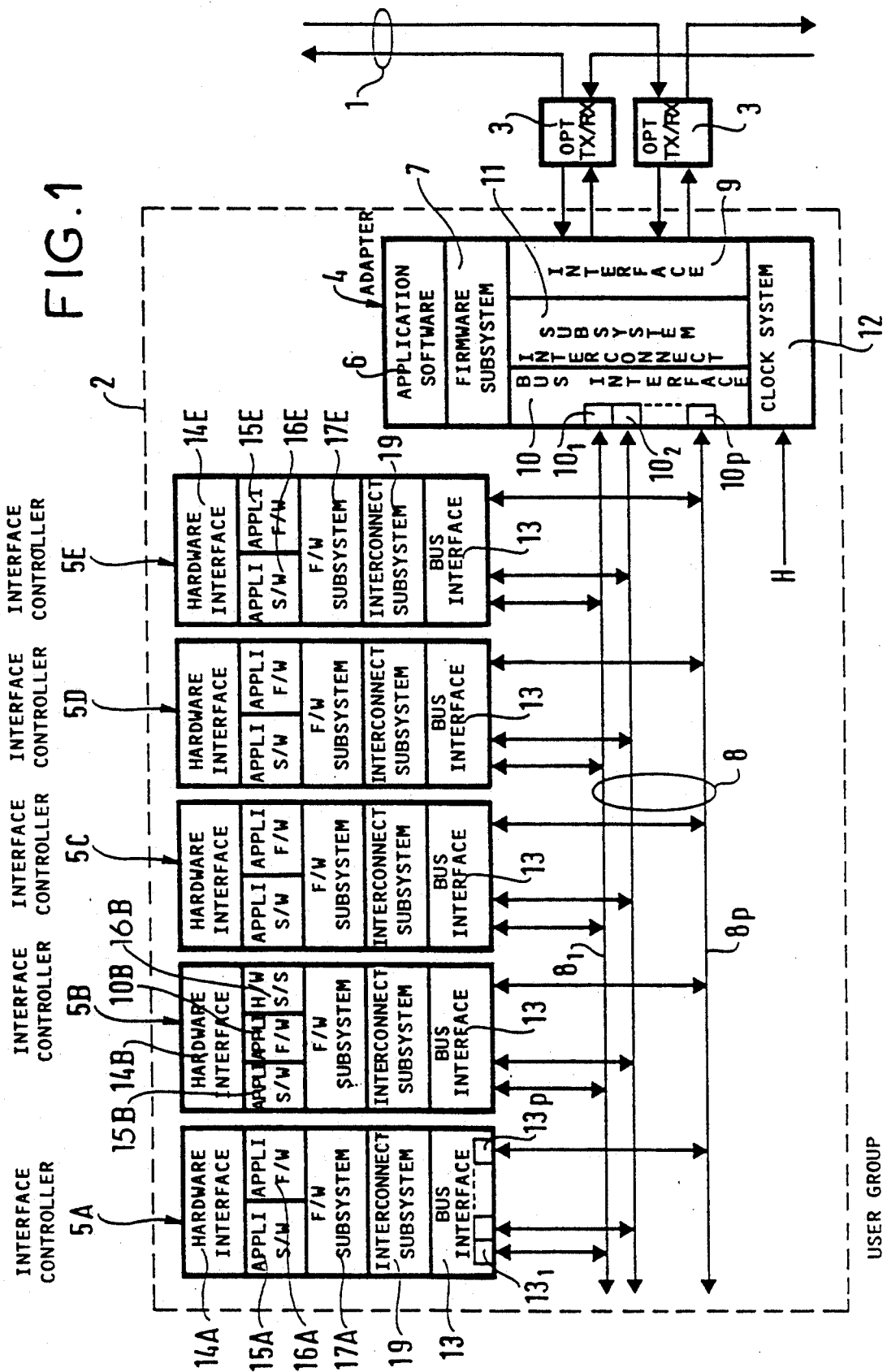
FIG. 1 shows one embodiment of a transmission system in accordance with the invention.

The embodiment of a transmission system shown in FIG. 1 is designed to be incorporated into a larger system, for example an extended local area network type system. A network of this kind, and in particular an integrated services digital network (ISDN), is likely to cover an entire town or city and to be based on a double transmission loop 1 implemented in optical fiber conveying digitized information at a high bit rate, for example 155 Mbit/s, for each of the two directions and in the form of cells such as, for example, those defined by the IEEE standard 802.6 for broadband integrated services digital networks.

A looped network of this kind is able to serve a plurality of groups of users distributed along the double loop by means of which they communicate; each group, like the single group 2 shown here, uses at least one of the services offered by the network.

An optical transmitter 3 connects each group 2, etc to each of the two optical links of the double loop 1. The optical transmitters 3 are designed to operate at the high digital bit rates made possible by the optical links and are connected to an adapter 4 in the group 2 that they serve, this adapter providing an interface between the optical transmitters 3 of the group and the interface controllers 5 (5A, etc) designed to meet the requirements of the users from group 2 and constituting equipments in the sense of the present description, together with the adapter 4.

The digital bit rates of the interface controllers 5 are generally very much lower than those of the double loop 1 and the interface controllers therefore do not require a level of performance comparable with that which the adapter requires for its communications with the double loop 1, either on their own account or with regard to the part of the adapter 4 which serves them.

In this example, an adapter 4 essentially comprises:
 application software 6 for the various tasks associated with the presence of the group 2 in the system served by the double loop 1 and with its membership of this system;
 a firmware subsystem 7 responsible for operation in general and in particular for switching and processing data exchanged between the double loop 1 and an electrical bus 8 serving the interface controllers 5 of the group 2 to which the adapter 4 in question is assigned;
 an interface 9 to the loop 1 implemented in software and hardware for transmitting and receiving optical signals via the optical transmitters 3;
 a modular electrical bus interface 10 in the form of a plurality of identical transmitter-receiver units $10_1$ through $10_p$, said bus interface combining software and hardware for transmitting electrical signals to the bus 8 and receiving electrical signals from it;
 an interconnect subsystem 11 implemented in software and hardware ensuring compatibility of the electrical signals transmitted between the two interfaces 9, 10 to which it is connected;
 a clock system 12 for synchronizing transmission and reception on the optical channel using the signals obtained in the loop 1 via the loop interface 9 and in the electrical channel using signals "H" specifically supplied to the group 2 by a synchronization clock (not shown).

The application software 6, the firmware subsystem 7, the interfaces 9 and 10, the interconnect subsystem 11 and the clock system 12 will not be described in more detail here as they are only indirectly related to the objects of the invention and are conventional and well known to those skilled in the art.

As already mentioned, in the proposed embodiment the adapter 4 and the interface controllers 5 of a group 2 are interconnected by a bus 8 to form a transmission system specific to the group. The bus 8 provides "p" time-division multiplex transmission links $8_1$ through $8_p$ to each of which is connected one of the transmitter-receiver units of the interface 10 and of each interface controller 5 of the group 2.

As already mentioned, the interface controllers 5 are designed to meet the specific requirements of users and tend to be specifically oriented towards particular applications although having equivalent general organizations.

In the proposed example they comprise an interface controller 5A for telephones and telephone terminals, an interface controller 5B for a central control unit of the group 2, an interface controller 5C for V.24 asynchronous data transmission terminals, a gateway type interface controller 5D for an auxiliary link to another group, and an interface controller 5E for an application processing data organized to a different standard, for example the IEEE standard 802.3/5 for access to an ETHERNET type network, etc.

As mentioned above, each of these interface controllers comprises, for example:
 an electrical bus interface 13 similar to the electrical bus interface 10 of the adapter 4 and comprising at least "p" transmitter-receiver units $13_1$ through $13_p$ for each interface controller 5 employing identical software and hardware for transmitting electrical signals to the bus 8 or receiving signals transmitted by it;
 at least one hardware interface 14 to the particular subsystem served by the interface controller in question, such as the telephone or telephone terminal access interface 14A for the interface controller 5A, the group 2 central control unit access interface 14B for the interface controller 5B, . . . the different standard access interface 14E for the interface controller 5E;

application software 15 (15A, 15B, 15C, 15D, 15E) relating to tasks specific to the interface controller in question;

an application firmware subsystem 16 (16A, 16B, 16C, 16D or 16E) connected to the corresponding interface 14 of the interface controller;

a firmware subsystem 17 (17A, 17B, 17C, 17D or 17E) responsible for operation in general and in particular for switching and processing data exchanged via the interface controller;

optionally an interaction hardware subsystem associated with the firmware subsystem of an interface controller, such as the subsystem 18B associated with the subsystem 17B of the interface controller 5B;

an interconnect subsystem 19 implemented in software and hardware for connecting the firmware subsystem of an interface controller to the interface 13 of that interface controller.

The bus 8 which interconnects the various transmitter-receiver units of the electrical bus interfaces 10 and 13 constitutes, for example, a backplane bus of a subrack in a telecommunication installation.

Figure 2:
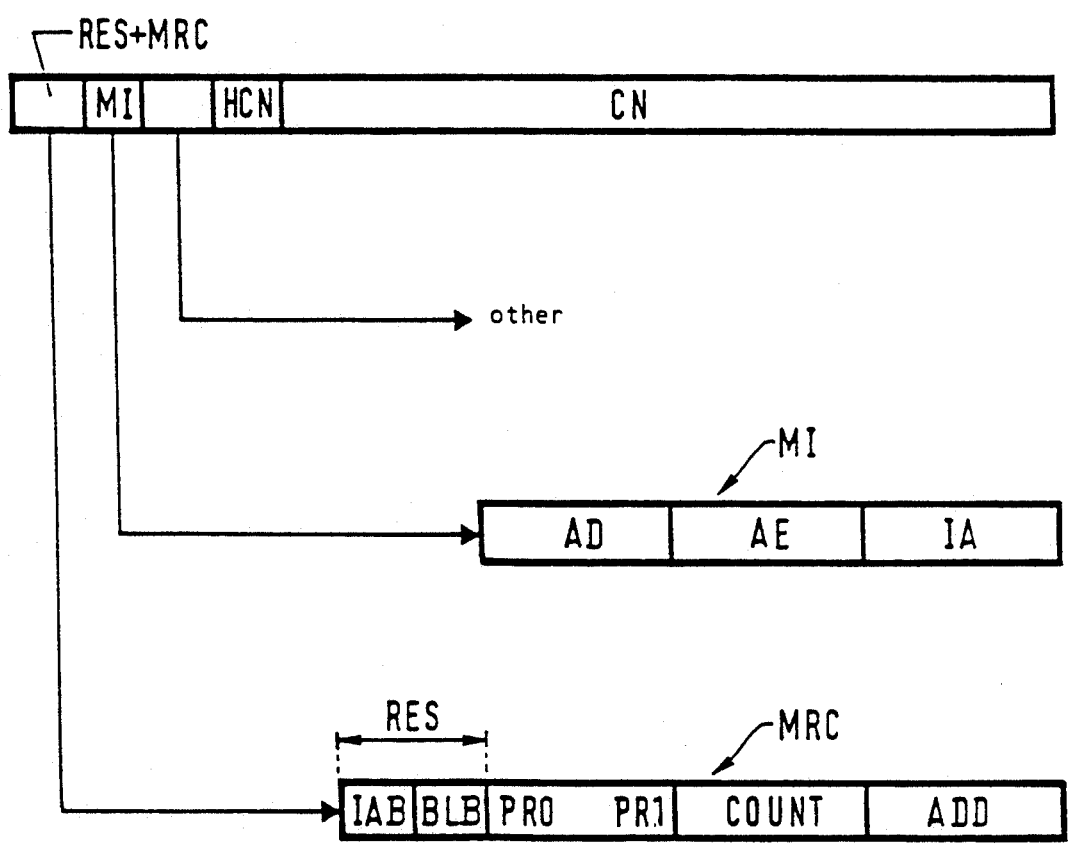
FIG. 2 shows one embodiment of a transmission structure for a system in accordance with the invention.

When the information transmitted on the double loop 1 is organized into standard cells CN (FIG. 2) of 48 octets preceded by a header HCN of 5 octets, the invention provides for choosing time-division multiplex transmission links $8_1$ through $8_p$ each adapted to transmit at least 53 octets and preferably at least 106 octets, in other words the equivalent of two cells per frame.

In this example, each time-division multiplex link has, in accordance, with CCITT Recommendation G.704 mentioned above, a bit rate in the order of 8 Mbit/s representing the transmission of a number "n" of 128 octets per frame of duration "T" equal to 125 μs.

In a known manner mentioned above, this choice also enables transmission of octets of signals produced by conventional primary PCM multiplex systems conforming to CCITT Recommendation G.732, in particular transmission of speech signals over isochronous channels at the rate of one octet per channel and per frame, after sampling and encoding of the signals in octet form.

One and the same time-division multiplex link is therefore able to transmit as many octets requiring the use of isochronous channels as the number of octets that can be transmitted by asynchronous channels, both being in this instance separately grouped into cells each comprising 48 octets and each preceded by a header of five octets.

In the proposed system where each equipment, that is to say the adapter 4 and each interface controller 5, is connected by a different interface transmitter-receiver unit 10 or 13 to each of the transmission links $8_1$ through $8_p$, provision is made for transmitting the bits of each cell serially over the same link, that is to say from a single transmitter-receiver unit, "p" transmitter-receiver units being able to transmit simultaneously, each on a different link of the transmission system 8, the entire system being preferably timed by a common clock.

The exchange of information in cell form between groups via the double loop requires the use of sophisticated cell headers which are not directly relevant to the transmission system via the internal bus 8 of a group 2, etc. The need to examine the headers at the transmitter-receiver units is avoided by using simplified dedicated addressing for transmissions between transmitter-receiver units within the transmission system 8.

Each cell transmitted over a link by a transmitter-receiver unit is therefore preceded by a destination address AD which may be, for example, the physical address of one of the equipments served by the transmission system 8 or a logical address which is meaningful for at least one of these equipments.

This addressing specific to the transmission system which avoids the need to examine the header HCN of cells at levels where such examination is not indispensable makes it possible to achieve the same level of efficiency and increased reliability with less sophisticated equipment components because the processing speeds can be lower and costs thereby reduced.

In the embodiment envisaged, a specific physical or logical addressing octet is added before the header HCN of any cell transmitted on any link of the transmission system 2, at the time it is sent by an equipment, to enable the cell to be handled by the destination equipment(s) which eliminate(s) this addressing octet after processing it.

The addressing octets are generated, for example, at the electrical bus interfaces or the individual equipment interconnect subsystems by means of a conventional logic device commanded for each transmission on one of the links of a bus in a well known manner that will not be described in more detail here as it is related only indirectly to the invention.

A simple address recognition device implemented in hardwired logic, for example, is sufficient to enable an equipment such as a circuit board to select the cells addressed to it from all the cells transmitted.

In a preferred embodiment an indication of the address AE of the sending equipment is associated with each cell addressing octet, for example in the form of a supplementary octet transmitted after the addressing octet and before the first header octet HCN of the cell in question.

An additional indicator IA can also be added for the benefit of the destination equipment(s) to individually identify each cell relative to the cells of the same cell transmitted from the same transmitter equipment. To this end, the transmitter equipment is adapted to provide by counting successive identifying numbers for the cells of a packet which it sends in succession together with an end of packet identification code; these cell identification numbers and this end identifier are, for example, encoded on one octet transmitted with the cell addressing octet and the octet specifying the sending equipment address. The succession of bits formed by combining a destination address, a sending equipment address and optionally an additional cell identifier indication and/or end indication together form an identifier message which is transmitted before the header HCN of the cell which it individually identifies on the transmission link concerned.

Because each equipment associated with the transmission system 8 is likely to require to send, a contention structure is provided for assigning the transmission links $8_1$ through $8_p$ to the equipments, for example by means of a round robin priority system enabling response to the changing requirements of the equipments according to instantaneous availability.

In the proposed embodiment, to maximize security, flexibility and availability, even when operating in a degraded mode, provision is made for regulating contention link by link.

To this end, equipments requiring to transmit via the transmission system 8 attempt to acquire one of the "p" links $8_1$ through $8_p$ temporarily for this purpose.

Of course, the transmission of octets requiring the use of isochronous channels by one or more equipments implies a different procedure than that provided for cells that can be transmitted asynchronously and, for example, for these octets there is temporary provision for systematic reservation of a cell in each frame on one of the links of the transmission system 8 for the time needed for the equipment(s) to transmit octets of this type.

The identifier message MI of each cell is therefore preceded by an assignment message, made up of four octets, for example.

In this example the assignment message comprises a reservation module (field) RES followed by a contention resolution module MRC.

A first reservation module element IAB represents the assignment of the cell which follows to the transmission of isochronous channel octets; for example, it comprises a bit whose value indicates whether the cell following it is assigned as explained here or not.

Because the transmission of isochronous channel octets can be a lengthy process, provision is preferably made for systematic marking of the IAB reservation element of one or more cells identically positioned within successive frames on the link(s) of the transmission system 8 that they use.

This marking is preferably reserved for a specific equipment, for example, the central control unit of a group, which operates via its interface controller 5B.

In the example proposed, each reservation module RES includes a second element BLB for assigning in a similar way to that described above the use of the cell following it, for carrying out tests, for example, the reservation then making it possible to force the traffic onto a particular link of which only the cells are not reserved by virtue of the associated BLB elements. Each BLB element is a single bit, for example just like the IAB element which it follows.

Contention between unreserved cells is dealt with by the contention resolution module MRC bits which can each be forced to either one of two values by all of the equipments served by the transmission system 8, unlike the IAB and BLB reservation elements preceding them.

Contentions concerning the cells transmitted by the different links are staggered in time. This is a simple and effective way of resolving contention between equipments requiring to transmit simultaneously and therefore requiring to reserve for their respective benefit the available cells on the links of the transmission system 2.

This is achieved by assigning clock times offset by a same specific amount to the transmission of the contention resolution modules—in practice the assignment messages each combining a reservation module RES with a contention resolution module MRC—of the cells on each of the various links $8_1$ through $8_p$ timed by a common clock, so that the transmission of a bit, and in particular the transmission of the first IAB element of a message on a link, is not simultaneous with the transmission of the functionally equivalent bit of any other link of the same transmission system 8.

Figure 3:
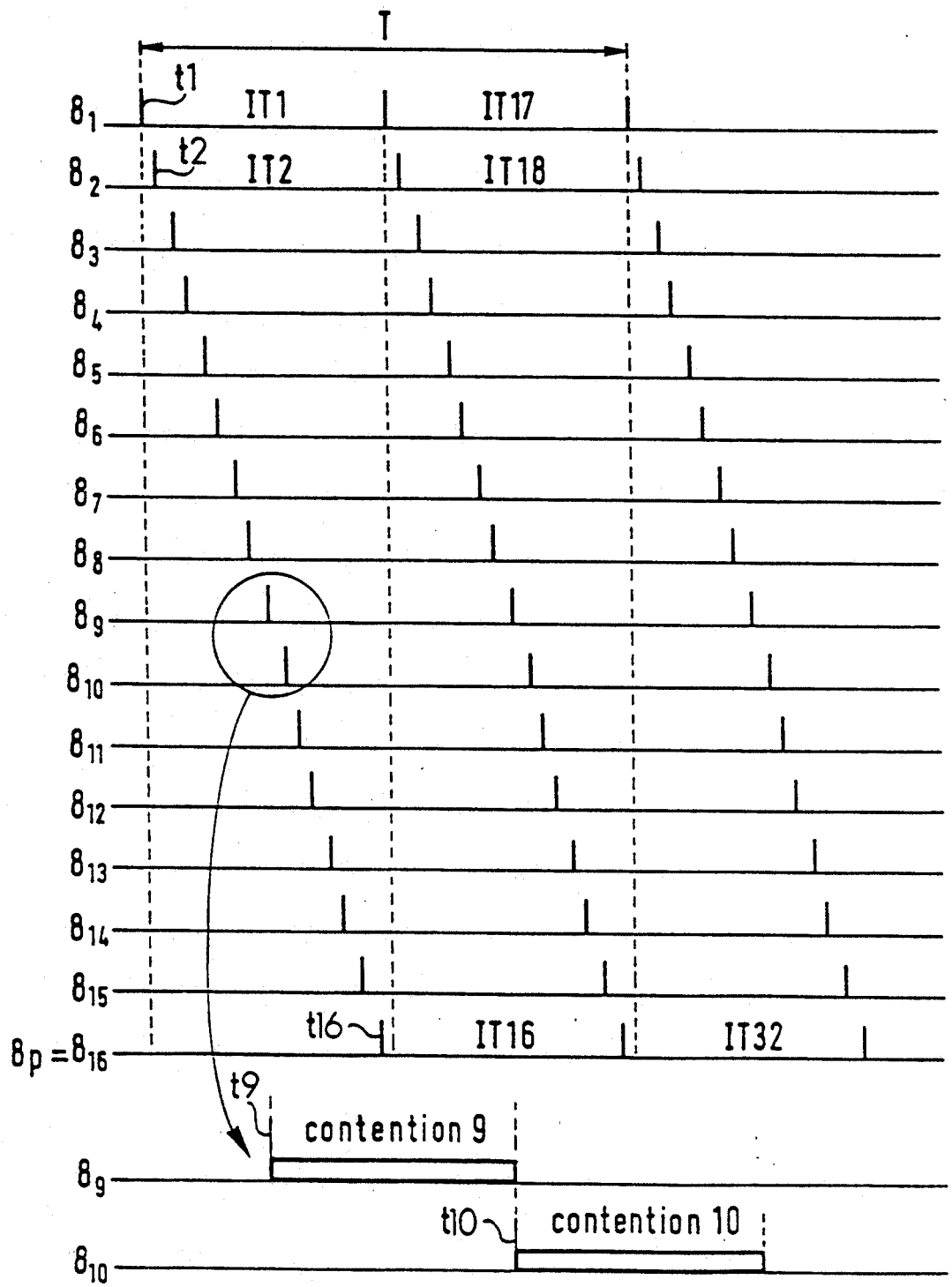
FIG. 3 is a diagram illustrating the contention method used in a transmission system in accordance with the invention.

In the example shown in FIG. 3, in which the first IAB element of a reservation message transmitted on the link $8_1$ is transmitted at the same time as the first time slot IT1 of a frame T, the transmission of the first IAB element of a reservation message transmitted on the link $8_2$ is subject to a time-delay equal to one time slot plus a clock period, in other words at the start t2 of the second time slot of the frame T and so on, the first IAB element of a reservation message transmitted on the link $8_{16}$ having to be transmitted during the time slot IT16 of the frame T on the link $8_p$, which in this example is the 16th one.

Although the offsets introduced in this way prevent simultaneous contention between equipments for a number of different cells, it is also necessary to make provision for the assignment of an available cell to one of the equipment requiring to transmit which will be regarded as having the highest priority. This can be achieved by using a method which forces at least some bits of the contention resolution module MRC of the cell conjointly or in isolation by the equipments concerned which on the one hand write and on the other hand read this module as it is constructed to determine individually if the cell they require is still available for them or not.

Methods of this kind are well known and one of them entails the equipment(s) competing to transmit forcing a link on which a cell is the subject of contention to one or the other of two binary levels; the equipment(s) having the highest priority force the link to the "0" level, for example, whereas the other(s) attempt to force it to a "1" level; the only equipment(s) which remain in contention is or are the equipment(s) which read on the link the value which they forced, the other(s) being eliminated.

In the embodiment proposed, each equipment requiring to transmit attempts to reserve a cell for itself successively on each of the links using a multi-bit priority element (PR0, PR1). During this procedure contentions that may arise on any of the links of the transmission system 2 are resolved by the procedure continuing until the transmission has been effected.

To this end, each equipment counts the number of successive failures and marks accordingly the link on which it is attempting to reserve for itself an available cell during frame bit times corresponding to the bits of the COUNT element preceding that cell.

The equipment whose marking then represents the greatest umber of failures is then elected if it is only one.

A third element ADD is added to each contention resolution module MRC for resolving contentions not previously resolved, by taking account of binary addresses given to the equipments for assigning priority as a last recourse, priority being assigned to the equipment with the lowest address, for example.

As shown at the bottom of FIG. 3, the cell assignment message (RES+MRC) associated with successive time slots (IT8, IT9) on adjacent links ($8_9 8_{10}$) preferably do not overlap in time.

I claim:

1. Transmission method for a communication system bus which interconnects a plurality of devices communicating with each other by means of cells formed from data relating to one or more isochronous or asynchronous transmission channels and which comprises a predetermined plurality p of physical time-division multiplex links with each of the physical links being connected to each of the devices, said method comprising the steps:

providing a succession of p contention phases each relating to a different said physical link and staggered in time so that at any given time there will be at most one contention phase, transmitting conjointly and bit by bit during a respective related contention phase over a respective one of said p physical links, respective distinctive contention resolution messages from those contending devices simultaneously desiring to transmit on said respective physical link based on respective individual priorities translated into a predetermined binary form, disconnecting each lower priority contending device on the first bit of a composite contention resolution message received over said respective physical link which does not match the corresponding bit of the respective contention resolution message sent by said each lower priority device, sending at least one cell in serial form over the respective physical link from a higher priority device for which the composite contention resolution message received over the respective link matches the respective contention resolution message sent by said higher priority device.

2. Transmission method according to claim 1 wherein periods of the contention phases reserved for the transmission of contention resolution messages relating to the various physical links are equally distributed in time and are repeated in an identical manner in successive transmission time-division frames.

3. Transmission method according to claim 1 wherein at most only one cell is sent during said sending step following each of said contention phases, regardless of whether any other contention resolution messages were also transmitted during said contention phase by other lower priority devices.

4. Transmission method for a communication system bus which interconnects a plurality of devices communicating with each other by means of cells formed from data relating to one or more isochronous or asynchronous transmission channels and which comprises a predetermined plurality p of physical time-division multiplex links with each of the physical links being connected to each of the devices, said method comprising the steps:

providing succession of p contention phases each relating to a different said physical link and staggered in time so that at any given time there will be at most one contention phase, transmitting conjointly and bit by bit during a respective related contention phase over a respective one of said p physical links, respective distinctive cell assignment messages from those contending devices simultaneously desiring to transmit on said respective physical link based on respective individual priorities translated into a predetermined binary form, each said cell assignment message including a contention resolution field which includes at least one priority element representative of a priority level of at least one of said devices requesting to transmit having a highest priority and being preceded by a reservation field indicating whether the cell following the received cell assignment message is an asynchronous cell available for a transmission from any of the contending devices, disconnecting each lower priority contending device on the first bit of a composite cell assignment message received over said respective physical link which does not match the corresponding bit of the respective cell assignment message by said each lower priority device, sending at least one cell in serial form over the respective physical link from a higher priority device for which the composite contention resolution message received over the respective link matches the respective contention resolution message sent by said higher priority device.

5. Transmission method according to claim 4, further comprising the step transmitting an identifier message specifying at least a physical or logical address of a destination device relative to the system, said identifier message being sent following each cell assignment message and before the cell.

6. Transmission method according to claim 5 wherein said identifier message also specifies a transmitting device address and includes one or more additional elements selected from the group consisting of cell rank and end identification.

7. Transmission method according to claim 4 wherein the contention resolution field further includes a count element representative of a number of times a transmitting device was disconnected while attempting to transmit a given cell, followed by an address element uniquely identifying the transmitting device.

* * * * *